United States Patent [19]

Dake

[11] 4,144,665
[45] Mar. 20, 1979

[54] FISHING LURE

[76] Inventor: Donald W. Dake, 6460 Salem Ave., Clayton, Ohio 45315

[21] Appl. No.: 824,816

[22] Filed: Aug. 15, 1977

[51] Int. Cl.$^2$ .............................................. A01K 85/00
[52] U.S. Cl. .................................. 43/42.35; 43/42.36
[58] Field of Search ............................ 43/42.35, 42.36

[56] References Cited

U.S. PATENT DOCUMENTS

| 2,123,951 | 7/1938 | McArthur | 43/42.35 |
| 2,186,780 | 1/1940 | DeWitt | 43/42.35 |
| 2,522,179 | 9/1950 | Jensen et al. | 43/42.36 |

Primary Examiner—James L. Jones, Jr.
Attorney, Agent, or Firm—Biebel, French & Nauman

[57] ABSTRACT

A fishing lure has a molded two-piece body including an upper section and a lower section joined along a parting line and encapsulating a central air compartment so that the body of the lure will float. The lure attaches to a line through a diagonal opening through the lure and is free to ride up the line away from the hook, if the hook becomes snagged or when a fish is caught. The upper and lower body portions define split bill segments with the lower segment being extended forwardly, both to provide a diving action and to provide a tilting or leverage action so that the hook is lifted over obstructions, while the upper bill segment forms a V-shaped slot with the lower bill segment to entrap air and provide an attention-getting bubbling action.

3 Claims, 5 Drawing Figures

U.S. Patent  Mar. 20, 1979  4,144,665
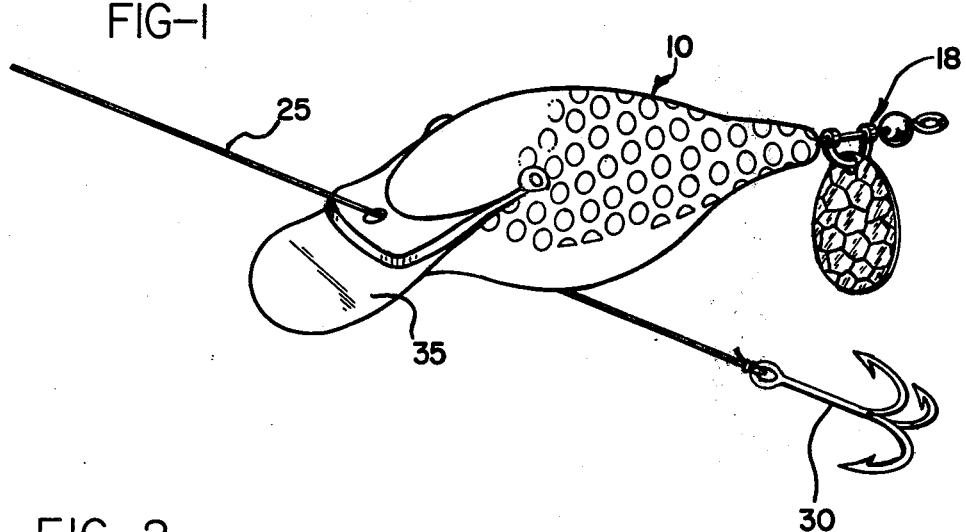
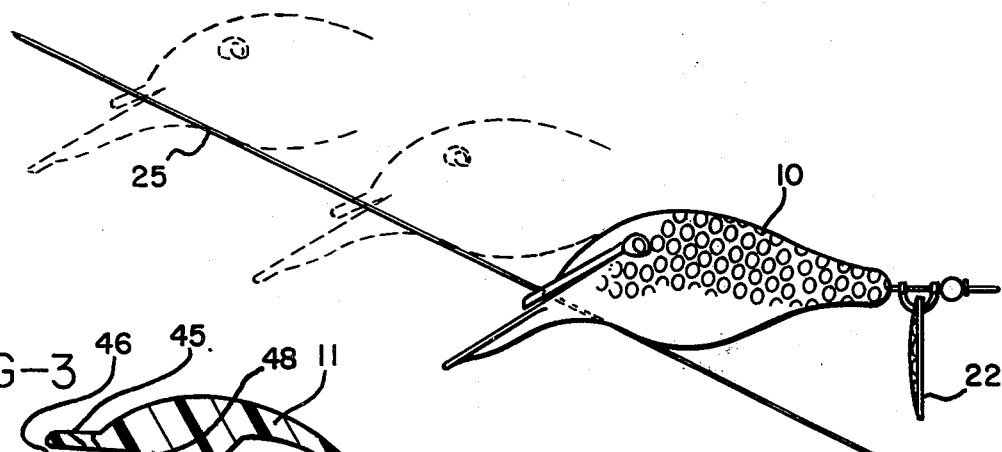
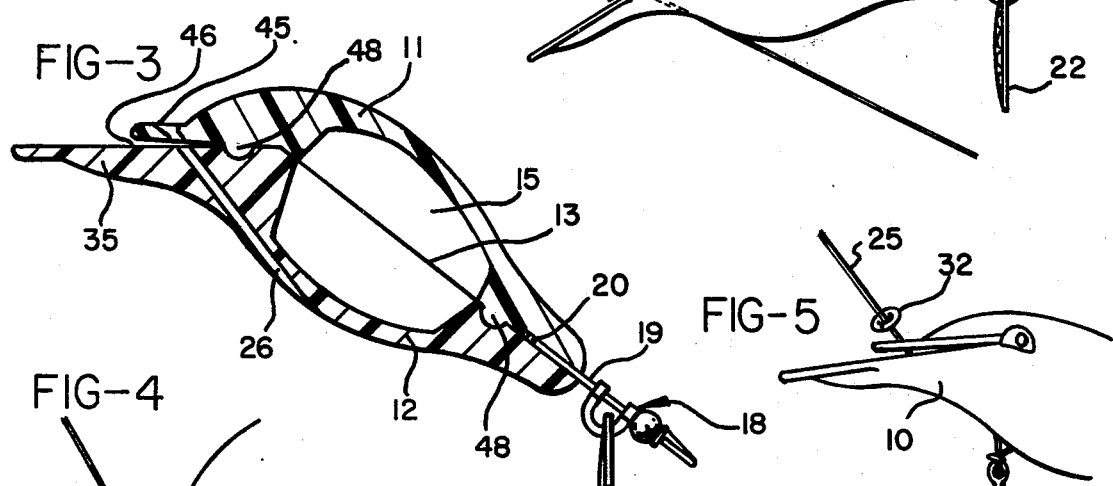
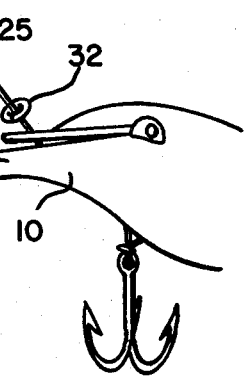
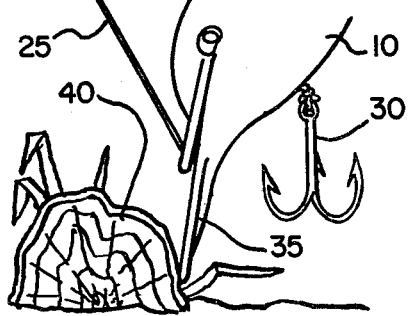

FISHING LURE

BACKGROUND OF THE INVENTION

This invention relates to artificial fishing lures and more particularly to a casting plug which is slidably engaged on the fishing line so that the same may move upwardly along the line away from the hook. While a number of prior patents have shown fishing lures which are slidably or releasably secured to the line, these fishing lures have not enjoyed popularity or success due to various deficiencies in their designs.

SUMMARY OF THE INVENTION

The present invention is directed to a molded plastic fishing lure which is free to move along the fishing line. The hook is not attached to the body, but rather is attached to an end of the line extending through a diagonal aperture formed in the body. The body is molded in two halves and has an air compartment formed therein. The lower half of the body has a forwardly extending bill which provides both a diving action and a leverage action to assist the bait in retrieval over snags and the like, while the upper half of the body forms a shorter forwardly extending bill which diverges from the bill of the lower body portion to define therebetween a wedge or V-shaped slot which provides a bubbling action and improved control of the bait during retrieval.

It is accordingly an object of this invention to provide an improved casting bait which is free to slide up or move along the fishing line and which does not have a direct connection with the hook.

Another object of the invention is the provision of a lure, as outlined above, in which upper and lower halves are joined and which respectively form bills of differing lengths defining therebetween a slot, and futher in which a diagonal line receiving passage is extended through the upper and lower halves at or adjacent the bills to receive a line and hook therethrough.

These and other objects and advantages of the invention will be apparent from the following description, the accompanying drawings and the appended claims.

BRIEF DESCRIPTION OF THE DRAWINGS

FIG. 1 is a perspective view of a fishing lure constructed according to my invention;

FIG. 2 is a side elevation thereof showing the manner of movement of the lure along the line;

FIG. 3 is a longitudinal section through the lure;

FIG. 4 shows the manner in which the bill pivots the lure over a snag; and

FIG. 5 shows the lure in the normal assembled position on a fishing line including a temporary rubber retainer on the line above the lure.

DESCRIPTION OF PREFERRED EMBODIMENT

The lure 10 of the invention has a body molded of two halves of plastic material including an upper body portion 11 and a lower body portion 12, as shown in FIG. 3. The bodies are joined together along a longitudinal parting line 13, and the body portions define therebetween an enclosed air chamber or compartment 15. The size of the air compartment 15 is not critical but is preferably sufficient to provide a floating action for the body of the lure together with the attached spinner assembly 18. The spinner assembly 18 includes a wire 19 with an inwardly turned end 20 captured between the body portions 11 and 12 at the parting line 13, and carries a spinner 22 on its remote end. When the body portions are assembled and are solvent bonded together, the spinner assembly 18 is secured by the end 20.

The lure 10 includes means for slidable attachment to a fishing line 25. For this purpose a diagonal opening 26 is formed through the body portions 11 and 12. The opening thus extends from a forward nose portion of the lure downwardly and terminating generally at a central bottom region of the lure in underlying in relations to the compartment 15. The line 25 may thus be extended through the opening 26 and a conventional three-point gang hook 30 attached to the extended end of the line. During retrieval the lure 10 will ride down the line 25 to the point where the top eye of the hook 30 engages the lower surface of the body portion 12 at the opening 26, essentially as shown in FIG. 5. A rubber donut 32 or a piece of rubber band or the like may be applied, if desired, to the line 25 immediately above the lure 10 to assure that the lure does not inadvertently slide up the line when such action is not required.

The lure 10 at the lower body portion 12 is further provided with a first forwardly extending shovel or bill 35. This bill 35 extends forwardly a distance of approximately one-half of the length of the body from the point at which the opening 26 exits through the bottom body portion 12. The bill serves to assist the bait in a diving and wobbling action during retrieval. Also, the bill 35 assists the bait in being retrieved over snags and the like, such as illustrated in FIG. 4. Since the flotation compartment 15 is essentially formed rearwardly of the diagonal opening 26 with respect to the body portions, the bait will tend to assume a tilted position as shown in FIG. 4 when the bill 35 engages a snag 40, thus in effect providing a leverage action lifting the hook free and clear of the snag with gentle retrieval.

The lure 10 is also formed with a second forwardly extending bill portion 45 in the upper body portion 11. However, this bill portion has a longitudinal length substantially less than that of the bill 35. The body portions at the bills 35 and 45 define a generally V-shaped, forwardly opening slot or wedge 46. The diagonal opening 26 extends through each of the bill portions and in intersecting relation to the slot 46. This slot entraps air therebetween and, during retrieval, tends to provide a bubbling action.

The body halves are joined along generally planar portions of the parting line with locating bosses 48 formed in the upper body portion 11 received in corresponding indentations formed in the lower body portion, so that the parts may readily be located to each other during assembly. The body portions are then solvent welded to entrap air within the compartment 15.

In use, a hook 30 will be tied to a line 25 extended through the diagonal opening 26, as shown in FIG. 1. During normal retrievel the lure 10 will ride down the line 25 and rest against the upper eye of the hook 30 essentially as shown in FIG. 5, and the depth of action may be controlled by the rate which the lure is retrieved. If desired, weight may be added to the line and the lure may be permitted to bump along the bottom, somewhat as shown in FIG. 4. In any event, if an obstruction or snag is encountered, gentle retrieving will often permit the lure to pivot about the forwardly extending bill portion 35 and free itself. In the event that the lure itself does become snagged or entangled in deep water or the hook 30 can not readily be unsnagged, the fisherman may simply choose to break the line, and regardless of whether the line breaks at the hook or further up, the lure 10 will slide free of the line and float up to the surface for retrieval. Further, when a fish hits the lure and becomes caught on the hook 30, the fish can not obtain any leverage from the lower body since the lure is free to move along the line as illustrated by the broken line views in FIG. 2.

The slot 46 formed between the bills 35 and 45 provides a wedge of air when initially retrieved and this air escapes in a bubbling action during retrieval and enhances the attention-getting aspects of the lure.

While the form of apparatus herein described constitutes a preferred embodiment of this invention, it is to be understood that the invention is not limited to this precise form of apparatus, and that changes may be made therein without departing from the scope of the invention.

What is claimed is:

1. A casting lure comprising upper and lower body portions joined together and defining an enclosed air chamber therebetween, means on said lower body portion defining a first forwardly extending bill, means on said upper body portion defining a second forwardly extending bill terminating short of the forward extent of said first bill and defining with said first bill a forwardly opening slot, and a diagonal line-receiving opening formed in said body portions and extending therethrough in intersecting relation to said bills from a position above said upper body portion adjacent the forward edge of said second bill to an exit position in said lower body portion in underlying relation to said chamber.

2. A casting lure comprising a body having an upper body portion, a lower body portion joined together along a longitudinally extending parting line and defining an enclosed air chamber therebetween, means on said lower body portion defining a forwardly extending bill, means on said upper body portion defining a second forwardly extending bill, a diagonal line-receiving opening formed in said body portions extending therethrough in intersecting relation to said bills from a position above said upper body portion adjacent the forward edge of said second bill to an exit position in said lower body portion in underlying relation to said chamber, said opening extending in a generally straight line, and said body being free to slide along a line through said opening.

3. A casting lure comprising a body having an upper body portion, a lower body portion joined together along a longitudinally extending parting line and defining an enclosed air chamber therebetween, means on said lower body portion defining a first forwardly extending bill, means on said upper body portion defining a second forwardly extending bill terminating short of the forward extent of said first bill and defining with said first bill a generally V-shaped forwardly opening slot, a diagonal line-receiving opening formed in said body and extending therethrough in intersecting relation to said bills and said slot from a position above said upper body portion adjacent the forward edge of said second bill to an exit position in said lower body portion in underlying relation to said chamber, one of said bills extending forwardly a distance from said opening measured from the lower body portion of approximately one-half the overall length of said lower body portion to provide a tilting action to said lure when said one bill engages snags or the like.

* * * * *